Feb. 11, 1964  A. J. TURCHI ET AL  3,120,706
DENTAL DRILL WITH COLLET

Filed Sept. 15, 1961  3 Sheets-Sheet 1

INVENTORS
ANTHONY J. TURCHI,
NATHANIEL H. LIEB
BY
Caesar and Rivise
ATTORNEYS.

Feb. 11, 1964 A. J. TURCHI ET AL 3,120,706
DENTAL DRILL WITH COLLET
Filed Sept. 15, 1961 3 Sheets-Sheet 2

INVENTORS
ANTHONY J. TURCHI,
NATHANIEL H. LIEB
BY Caesar and Rivise
ATTORNEYS.

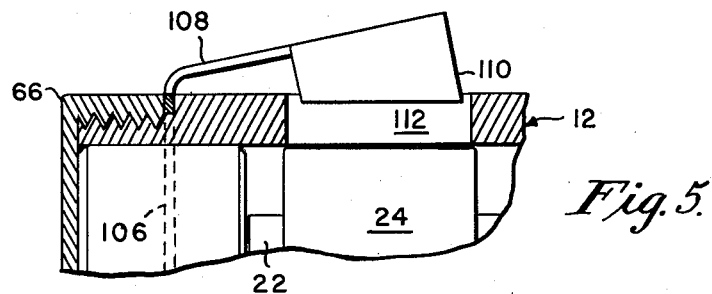
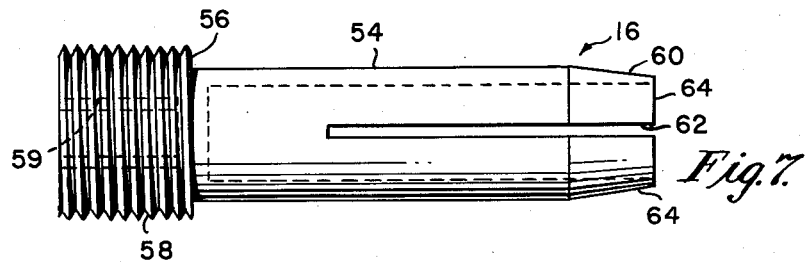
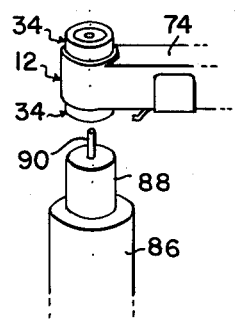 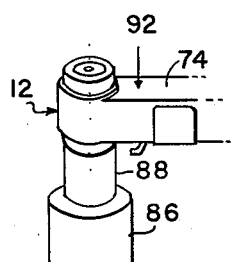 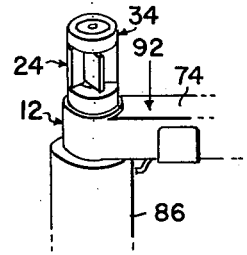
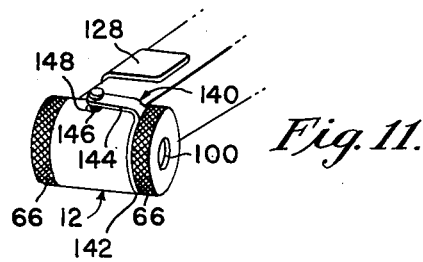

United States Patent Office 3,120,706
Patented Feb. 11, 1964

3,120,706
DENTAL DRILL WITH COLLET
Anthony J. Turchi, Bala-Cynwyd, and Nathaniel H. Lieb, Philadelphia, Pa., assignors to Star Dental Manufacturing Co., Inc., Philadelphia, Pa., a corporation of Delaware
Filed Sept. 15, 1961, Ser. No. 138,522
8 Claims. (Cl. 32—27)

This invention relates to a dental drill and has as an object the provision of a new and superior device of the class described.

This application is a continuation-in-part of my copending application Serial No. 822,131, filed June 22, 1959, now Patent No. 3,074,167.

It is known to supply the necessary rotative power to a dental bur by means of a round belt pulley system operatively connected to a source of power. Recently, the demands of high speed dentistry have necessitated the development of improved round belt systems and of flat belt pulley systems in order to effect a dental cutting tool speed of from 25,000 to 250,000 r.p.m. These pulley systems are costly, require maintenance and are an ever dangerous hazard should the dentist or patient be nearby.

Moreover, the latest high speed dental techniques require that the rotating dental tool be safely secured to the rotary actuating means. It is known to use a threaded or latch chuck to accomplish the above purpose. Nevertheless these devices have proved to be unsatisfactory. These chucks cause inconvenience to the dentist in necessitating frequent changes of the cutting tools. Moreover, it is always possible that the holding means may be loosened by the action of the high speed tool.

Recently, plastic or rubber sleeves have been employed as chuck means for dental cutting tools. These sleeves, however, wear out quickly and their holding power is an uncertainty.

In my aforementioned copending application Serial No. 882,131, a chuck is disclosed which comprises collet with expandable jaws. The collet jaws are compressed to a normally closed position by being confined within the bore of a rotor. The collet jaws are expanded to an open position by urging them out of the bore. The collet is spring-biased so as to be always urged into the bore.

It is an object of this invention to provide a new and improved collet.

It is another object of this invention to provide a novel air-driven rotor assembly.

It is a further object of this invention to provide a simple and efficient means for replacing and changing dental burs.

It is a further object of this invention to provide a novel chuck means which will safely secure a dental bur at the necessary high speeds.

These and other objects are accomplished by providing a rotary chuck comprising rotor means adapted to be rotated having a hollow bore, a collet secured via threads in said bore for rotation with the rotor means, said collet being tapered at one end, with the bore of the rotor means being correspondingly reduced at the end adjacent the tapered end of the collet, and means cooperating with said threads for moving the collet longitudinally within the bore.

Other objects and many of the attendant advantages of this invention will be readily appreciated as the same becomes better understood by reference to the following detailed description when considered in connection with the accompanying drawings wherein:

FIG. 5 is a fragmentary sectional view taken along the line 5—5 of FIG. 3;

FIG. 7 is a side elevational view of an embodiment of the collet used in connection with the present invention;

FIG. 8 is a perspective view showing an element about to be used to remove the turbine cartridge from the turbine housing;

FIG. 9 is similar to FIG. 8, but shows the turbine cartridge partially removed;

FIG. 10 is similar to FIG. 8, but shows the turbine cartridge fully removed; and, FIG. 11 shows a modified form of the spring clip rotor brake.

Referring now in greater detail to the various figures of the drawings wherein similar reference characters refer to similar parts, a dental handpiece embodying the present invention is generally shown at 10 in FIG. 1.

Figure 4:
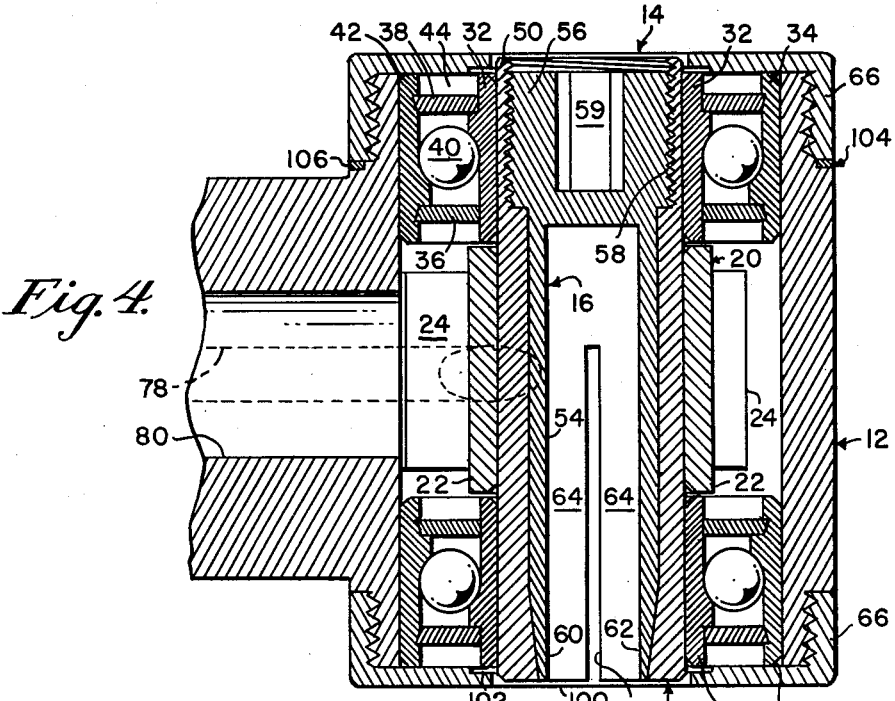
FIG. 4 is a fragmentary sectional view taken along the line 4—4 of FIG. 3.

As shown in FIG. 4, dental handpiece 10 includes a turbine housing 12 which contains a turbine cartridge, generally indicated at 14.

Figure 3:
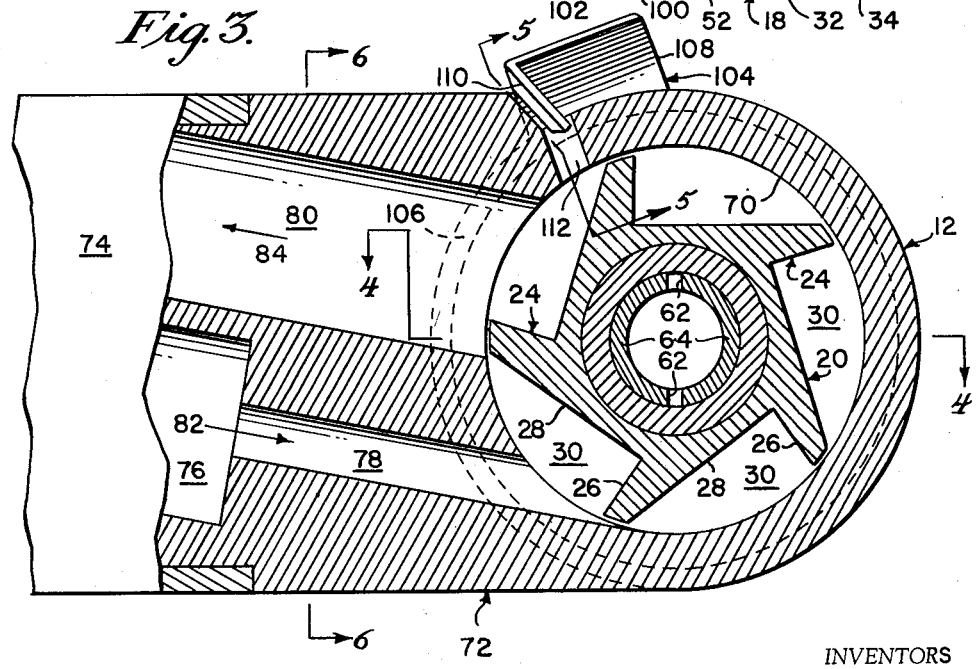
FIG. 3 is an enlarged fragmentary sectional view, partially in perspective, taken along the line 3—3 of FIG. 1.

Turbine cartridge 14 comprises a collet 16, a rotor shaft 18, a rotor 20 and ball bearings 34. Rotor 20 comprises a cylindrical hub 22, which is welded or otherwise secured to the exterior surface of rotor shaft 18. Integral with hub 22 are a plurality of rotor blades 24. As seen in FIG. 3, each rotor blade comprises a short side 26 and an elongated side 28. Short side 26 of one blade is substantially perpendicular to elongated side 28 of an adjacent blade, thereby forming air pockets 30. As will be explained hereinafter, air is forced into air pockets 30 thereby producing the desired rotation.

Frictionally fitted and adhesively secured to both outer ends of rotor shaft 18 are the inner races 32 of hollow, sealed, self-lubricating ball bearings 34. Each ball bearing 34 comprises rotatable inner race 32, sealing rings 36 and 38, ball 40, fixed outer race 42 and lubricant space 44. Bearings 34 are of the conventional type and their specific details do not form any part of the present invention. As seen in FIG. 4, inner races 32 are adjacent hub 22 on rotor shaft 18, but do not touch the hub.

As seen in FIG. 4, the central portion of rotor shaft 18 has a central bore and has a generally uniform wall thickness. The rear (top) portion 50 of the bore of shaft 18 is internally threaded with the bore being of a slightly larger diameter. The inner wall of the front (bottom) portion of the rotor shaft tapers inwardly, forming a lower end 52 of increasing wall thickness (smaller bore opening) relative to the wall thickness of the central portion of the shaft.

Mounted within the rotor shaft is the chuck collet 16, as shown in FIGS. 4 and 7. The central portion 54 of collet 16 is tubular in shape. The rear portion 56 is cylindrical and integral with the central portion. The rear portion is of a slightly larger diameter than central portion 54 and is externally threaded at 58 so as to be complementary with the internal threads of the rotor shaft bore. Rear portion 56 is internally and axially tapped at 59. The tap shown is hexagonal in shape, but other geometric shapes are suitable.

The wall thickness of the central portion 54 of collet 16 is uniform. However, the wall thickness tapers inwardly at the front portion 60 of the collet. The angle of taper 60 is identical to the taper 52 of rotor shaft 18. Thus the external surface of collet 16 fits flush with the internal surface of rotor shaft 18 throughout their respective lengths. Collet 16 additionally includes two longitudinal slits 62 (FIG. 3) which extend from the front end of the collet through substantially two-thirds of the length of the collet. The slits form two jaws 64 in the collet. When a clamping force is exerted on the jaws 64, they are compressed toward each other, thereby exerting a positive clamping or chucking action on the rearward portion of a dental bur inserted between them.

Figure 1:
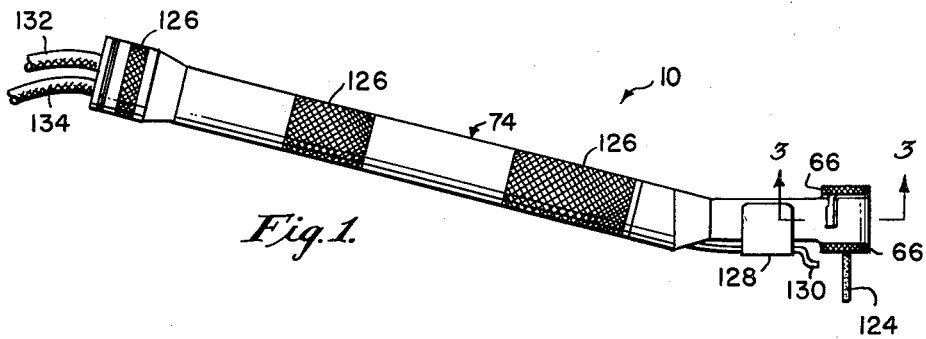
FIG. 1 is a side elevational view of a dental handpiece embodying the present invention with a dental bur fixedly attached in the operative position.

The entire turbine cartridge, which includes the rotor, bearings, collet, etc., is frictionally fitted within the confines of turbine housing 12, and held in place by end caps 66 which are threaded on the housing (FIG. 4). As shown in FIG. 1, the end caps have knurled surfaces to promote their easy removal and replacement.

As shown in FIG. 3, turbine housing 12 is generally cylindrical in shape, having a cylindrical interior 70. Integral with, and extending to one side of the turbine housing is boss 72 which connects the turbine housing with the handpiece 74. Boss 72 contains an air feed conduit 76 which connects with a second, and narrow air feed conduit 78. Boss 72 further contains an exhaust conduit 80.

In use, compressed air is fed into conduit 76 in the direction of arrow 82. Because connecting conduit 78 has a narrower diameter than conduit 76, the velocity of the air is increased therein. After passing through conduit 78, the compressed air fills cavity 30 and impinges against short walls 26 of rotor blades 24, thereby causing the rotor to move in a counterclockwise direction, as viewed in FIG. 3. It should be noted that the conduit 78 is slanted downwardly so as to provide substantially perpendicular impingement of the air against the rotor blades in the direction of motion of the blades. The air is exhausted through conduit 80 in the direction of arrow 84.

Rotor 20 possesses an outer diameter slightly less than the inner diameter of turbine housing 12 and so is free to rotate therein. The outer diameter of bearings 34 is slightly larger than the outer diameter of rotor 20 (FIG. 4). Thus, the outer races 42 of bearings 34 are frictionally fitted within housing 12 and are thereby precluded from rotation with rotor 20. Since rotor 20 and inner races 32 of bearings 34 are both adhesively joined to rotor shaft 18, the inner races will rotate whenever rotor 20 rotates.

If it should become necessary to change the turbine cartridge 14, the method of making the change is easily carried out, as illustrated in FIGURES 8, 9 and 10. The device for carrying out the change basically comprises a cylindrical pedestal 86, a narrow cylinder 88 secured to the top of the pedestal, and a cartridge removal pin 90 secured within the center of the narrow cylinder. The diameter of the narrow cylinder 88 is slightly less than the internal diameter of turbine housing 12. The method of removing the turbine cartridge comprises first removing both end caps 66 by unscrewing them. As is apparent from FIG. 4, this leaves the turbine cartridge, which is frictionally engaged within housing 12, free to be pushed out of either end of the housing. The cartridge is removed by first placing the housing 12 over the cartridge removal pin 90, and aligning the pin with tap 59 (FIG. 4), as shown in FIG. 8. The tap is inserted about the pin, and the handpiece is pushed downward in the direction of arrow 92, as shown in FIG. 9. With continued pushing, narrow cylinder 88 enters turbine housing 12 and completely ejects the turbine cartridge therefrom, as shown in FIG. 10. It is a simple matter to insert a new cartridge in the housing by aligning the cartridge with the interior of the housing and pushing it in place. The cartridge is centered and secured in place by replacing end caps 66 on the turbine housing.

It should be noted that each end cap contains a circular hole 100 (FIG. 11) which is slightly larger in diameter than the diameter of the rotor shaft. The purpose for the hole is to provide an opening to the collet for securing the bur, and a second opening to the collet for tightening and loosening the same to replace a bur. As seen in FIG. 4, end cap 66 is also provided with an annular recess 102 which is adjacent hole 100. The purpose of this recess is to prevent any contact between the inner race 32 of bearings 34 and the end cap. Thus the only parts of the turbine cartridge actually contacted by the end caps are the outer races 42 of bearings 34. None of the rotating parts are touched by the end caps.

Figure 2:
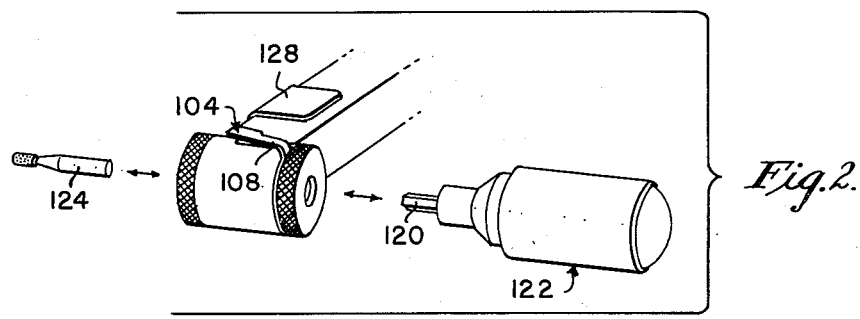
FIG. 2 is an enlarged exploded perspective view of the turbine housing of FIG. 1, and illustrates the method of securing a dental bur in the chuck.
Figure 6:
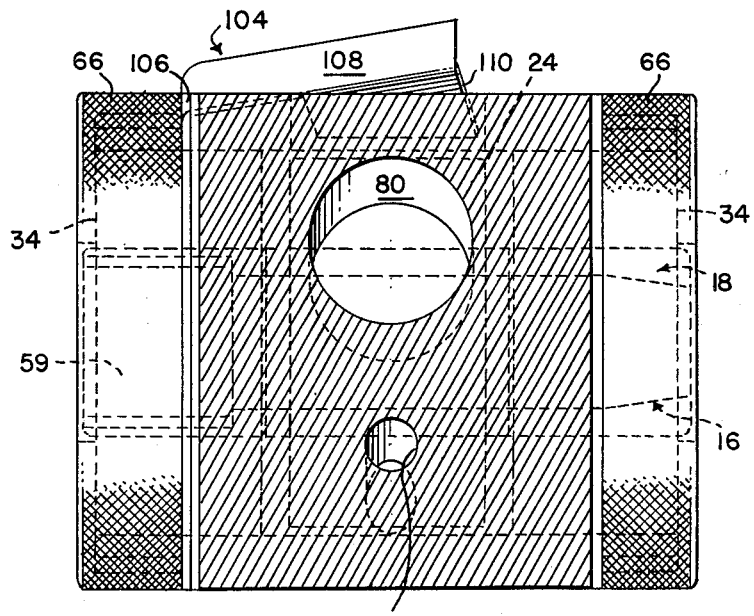
FIG. 6 is a sectional view taken along the line 6—6 of FIG. 3.

Secured to the upper end of the turbine housing is a spring clip rotor brake 104 (FIG. 2). The rotor brake 104 is unitary and made from spring steel or other resilient material. It basically comprises an annular ring 106, a flange 108 bent inwardly toward the opposite end of the turbine housing, and a leaf 110 on one end of the flange which is bent at an acute angle with respect to the flange. The rotor brake is secured in place by telescoping annular ring 106 over the upper end of housing 12 and covering it with cap 66.

As seen in FIGS. 3 and 5, leaf 110 is normally disposed as being slightly recessed in slot 112 of turbine housing 12. However, the length of leaf 110 is greater than the depth of slot 112, so that when flange 108 is depressed, leaf 110 will pass into the interior of turbine housing 12.

The method for changing a bur is illustrated in FIG. 2. This method comprises first depressing spring clip rotor brake 104 until leaf 110 is within the interior of housing 12 (see FIG. 5). This causes the leaf to contact one of the rotor blades 24, thus preventing further rotation of the rotor and the associated rotor shaft and collet. Next the hexagonal head 120 of chuck wrench 122 is inserted in hexagonal tap 59 of collet 16, and turned counter-clockwise. As viewed in FIG. 4, this results in moving collet 16 upward and outward. As is apparent, when the collet is moved upward, jaws 64 will spread, since they will no longer be constricted by the expanded forward wall portion 52 of rotor shaft 18. When the jaws are spread, dental bur 124 can be removed and a new one inserted in its place. The bur is clamped in place by turning the chuck wrench clockwise, thus moving the collet frontward or downward, as viewed in FIG. 4. This results in sliding the tapered front 60 of the collet against the expanded front section 52 of the rotor shaft, thereby constricting the jaws. It should again be noted that during the entire changing operation, the spring clip rotor break is depressed. If this were not done, the rotor assembly would freely rotate with the collet when the chuck wrench was turned in either direction.

As seen in FIG. 1, portions 126 of the handpiece 74 are knurled to promote easier handling. Slidably mounted on the portion of the handpiece adjacent the turbine is a spring clip 128, which supports the air and water spray tubes 130. Air tube 132 and water tube 134 lead into the handpiece 74. The foregoing features and the internal construction of the handpiece are fully disclosed in my aforementioned copending application Serial No. 882,131, and form no part of this invention.

An alternate construction of the spring clip rotor brake is shown at 140 in FIG. 11. Rotor brake 140 includes an annular ring 142 and an integral flange 144, as does rotor brake 104. However, in place of the integral leaf 110, rotor brake 140 includes a pin 146 to prevent rotation of the rotor assembly when desired which passes through a hole at the outer end of flange 144, and is secured thereto. Turbine housing 12 includes a hole 148 to receive pin 146.

Obviously many modifications and variations of the present invention are possible in the light of the above teachings. It is, therefore, to be understood that within the scope of the appended claims, the invention may be practiced otherwise than as specifically described.

What is claimed as the invention is:

1. In a dental handpiece, a turbine housing, a turbine cartridge within said housing comprising rotor means having a hollow bore, a collet mounted within said bore and secured to said rotor means, said collet comprising a plurality of compressible jaws at one end thereof separated by slits, said collet being tapered adjacent said jaws, said bore tapering at the same end as said collet, the taper of said bore complementing said taper on the collet, said bore being internally threaded at the end opposite the tapered end, said collet being externally threaded at the end opposite the tapered end, whereby the collet is threadedly connected to the rotor means, and means for moving the collet longitudinally with respect to said bore, whereby a dental bur can be secured in said bore by inserting it in the tapered end of said bore and compressing said jaws by moving said collet longitudinally with respect to said tapered end of said bore.

2. The rotary chuck of claim 1 wherein the means for moving the collet longitudinally comprises a tap in the end adjacent the external threading, said tap being adopted to receive a chuck wrench.

3. The invention of claim 1 wherein said rotor means comprises a plurality of rotor blades.

4. The invention of claim 3 and further including means associated with said rotor means to selectively prevent rotation of said blades.

5. The invention of claim 4 wherein the rotation-preventing means comprises an opening formed in said turbine housing and means associated with said opening adopted to pass therethrough and contact said rotor blades.

6. The invention of claim 5 wherein the means associated with said opening comprises a leaf spring secured to said housing and a dependent finger secured to said leaf spring, said leaf spring being inclined upwardly from the housing, whereby the leaf spring can be depressed and the finger inserted through said opening.

7. The invention of claim 1 and including conduit means in said handpiece for delivering a compressed fluid to said rotor means, whereby the rotor means is rotated by said compressed fluid.

8. The invention of claim 7 and further including a second conduit means in said handpiece for exhausting the compressed fluid.

References Cited in the file of this patent

UNITED STATES PATENTS

| 2,336,325 | Werber | Dec. 7, 1943 |
| 2,410,971 | Hartley | Nov. 12, 1946 |

FOREIGN PATENTS

| 847,331 | Great Britain | Sept. 7, 1960 |